April 24, 1962     J. S. COURTNEY-PRATT     3,030,852

OPTICAL DEVICE FOR USE IN CONTROLLING LIGHT TRANSMISSION

Filed Oct. 7, 1960

INVENTOR
J. S. COURTNEY-PRATT
BY H. O. Wright
ATTORNEY

3,030,852
OPTICAL DEVICE FOR USE IN CONTROLLING LIGHT TRANSMISSION
Jeofry S. Courtney-Pratt, Springfield, N.J., assignor to Bell Telephone Laboratories, Incorporated, New York, N.Y., a corporation of New York
Filed Oct. 7, 1960, Ser. No. 61,252
3 Claims. (Cl. 88—1)

This invention relates to apparatus for modifying the transmission of light energy. More particularly, it relates to apparatus for use in definitively controlling the transmission of light energy.

As long ago as 1690 Huygens observed surprising phenomena resulting from double refraction in calcite crystals. In 1845 Michael Faraday successfully induced optical activity in glass by a strong magnetic field oriented parallel with the propagation direction of the light.

In 1875 John Kerr discovered that a strong static electric field induced double refraction in glass. The now well-known Kerr cell, based upon this discovery, when placed between an optical polarizer and an optical analyzer, affords electrically controllable means for interrupting the transmission of light. Such arrangements operating with an applied high frequency current have been used successfully to produce relatively high frequency "chopping" of a light beam and related effects.

In 1907 Cotton and Mouton induced double refraction in liquid nitrobenzene by using a strong transverse magnetic field. The effect was found to be much stronger (that is, much more pronounced) than in glass.

Hans Mueller in the Journal of the Optical Society of America, volume 31 (1941), in an article starting at page 286, reports that a certain colloid called bentonite exhibits the double-refraction effect to a degree a million times stronger (that is, more pronounced) than in nitrobenzene.

The relative "Kerr phase retardation" in these media, namely, glass, nitrobenzene and bentonite colloids, as well as in other media to be mentioned hereinbelow, has been found to be substantially proportional to the square of the applied field and to the length of the optical path in the medium.

The conduction of light along a thin transparent dielectric cylinder, variously referred to as a channel or fiber, resulting from multiple internal reflections has been known for years and employed for transmitting light from one point to another. However, the "new practical branch of optics" known as "Fiber Optics," which involves the use of bundles of many channels comprising fine rods or fibers arranged in an ordered array for the transmission, or conduction, of light, has been developed, for the most part, during the decade just passed. For a reasonably comprehensive review of "Fiber Optics" and its presently known applications, reference may be had, for example, to the textbook entitled "Concepts of Classical Optics," by Strong, published by W. H. Freeman and Co., San Francisco, 1958, appendix N, pages 553 through 579, inclusive. This publication, insofar as it is pertinent to the present invention, is hereby incorporated by reference and thus made an integral portion of the present application.

In one aspect, an arrangement, as above described, employing a substantially conventional Kerr cell may be employed in lieu of the conventional mechanical shutter mechanism of a camera and when appropriately designed can provide an exposure of (that is, it can open and close the light aperture of the camera in) two-tenths of a microsecond ($.2 \times 10^{-6}$ second).

In an article entitled "A Rapid Action Shutter with No Moving Parts," published in April 1951 in the Journal of the Society of Motion Picture Engineers, Edgerton and Wyckoff reported a Faraday (electromagnetically operated) cell shutter capable of producing exposures having durations between two and twenty microseconds. In the September 1953 issue of the same journal, Edgerton and Germeshausen reported an improved Faraday type cell producing exposures of one microsecond.

For high speed photography, however, where, for example, it is desired to obtain instantaneous pictures of rapidly changing phenomena such as the flame front of an explosion, an exposure duration approaching $10^{-9}$ or even $10^{-10}$ second is desirable and may be required in many instances. In other words, arrangements employing substantially conventional cells, whether operated electrostatically or electromagnetically, are much too slow to provide the extremely short exposures required for high speed photography.

The major cause for the relatively slow operation of the electromagnetically operated conventional Faraday type of cell is that in order to obtain a sufficiently strong magnetic field throughout the whole dielectric, light-conducting portion of the cell a relatively large magnetizing coil having a very considerable inductance must be used. This, in turn, means, of course, that appreciable time is required for the building up and decay of the necessary magnetic field.

The present invention proposes to eliminate the above indicated difficulty by substituting, for example, a bundle comprising a large number of small diameter light-conducting channels or fibers for the solid block of the conventional Faraday cell and providing individual magnetizing windings on each channel fiber or each small subgroup of fibers in the form of a fine conductive filaments or wire wrapped helically around the length of the channel fiber or subgroup of fibers. All of these individual windings may then be connected in parallel and will have a total inductance very much smaller than that required for a single winding encircling the whole bundle of fibers (or an equivalent solid block) as in prior art conventional Faraday cells and similar arrangements. The reduction in inductance and operating time is approximately proportional to the number of windings, for example if 1,000 windings are employed the inductance and operating time can be reduced by approximately a factor of 1,000.

Where the bundle of optically conducting channel fibers comprises a very large number of individual channel fibers, for example, 10,000 or more, the bundle is more conveniently subdivided into small groups, for example, groups of 100 or less channel fibers each, and each group is then enclosed in an electrically conductive helical winding.

Accordingly, a principal object of the invention is to reduce the operating interval of electro-optical devices suitable for use as shutters in high speed photography and the like.

Other and further objects, features and advantages of the invention will become apparent from a perusal of the following detailed description of a specific illustrative embodiment of the invention.

Figure 1:
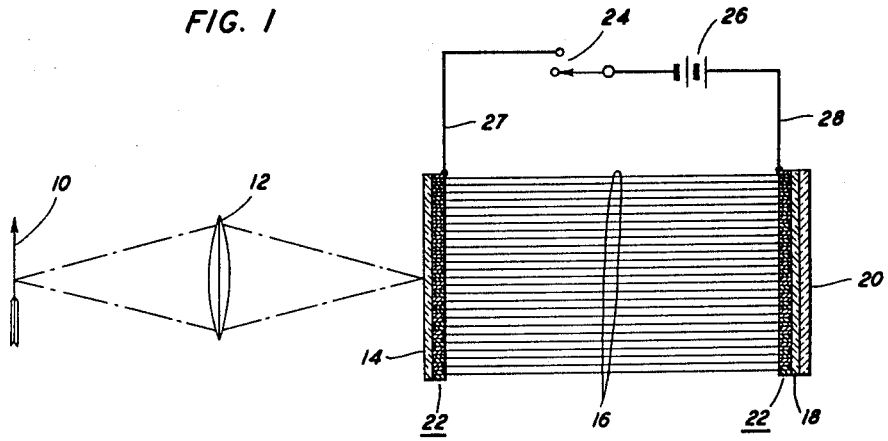
FIG. 1 is illustrative of the employment of an electro-optical device of the invention as a "shutter" for high speed photography.

In more detail in FIG. 1, an image of an object 10, illustrated as an arrow, is focussed by lens 12 on the polarizing plate 14. The light is linearly polarized by plate 14 in a first definite direction, as for example vertically. A bundle 16 of regularly arranged light-conducting channel fibers, arrayed so that their left ends collectively substantially cover the right surface of plate 14, conducts the light image without altering its polarization from plate 14 to the left surface of a second polarizing plate 18. The right ends of the bundle of channel fibers 16 cover the left surface of plate 18 collectively in the same manner and arrangement as the left ends cover the right surface of plate 14 so that the image focussed on plate 14 is thus faithfully transferred to the left surface of plate 18. Plate 18 is oriented so that it will pass only light which is linearly polarized in a second definite direction, as for example normal to the plane of the drawing, and therefore will not pass the vertically polarized light to photographic plate 20.

Figure 2:
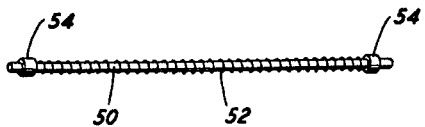
FIG. 2 is illustrative of a single channel fiber with an individual winding thereon as employed in one form of structure of the invention.

The bundle of channel fibers 16 may comprise a large number (several thousands or more) of individual light-conducting channel fibers each having a helical winding thereon, such as that illustrated in FIG. 2. In FIG. 2, light-conducting channel fiber 50 may typically be .004 inch in diameter and from a few tenths of an inch to several inches long. It is provided with an electrically conductive helical winding 52 which extends the length of the fiber and can be of fine wire or, alternatively, can be a filament of conductive material deposited or printed on the fiber. If of wire, it may be insulated initially. Alternatively, a bare wire or conductive filament may be used and sprayed with a thin coating of insulation when in position on the fiber. Preferably, a narrow, thin, metallized band 54 at each end of the fiber is electrically connected with the respective nearer ends of the winding 52 so that when the bundle 16 is assembled all of the individual fiber windings will be connected electrically in parallel, by contacts between their respective end bands, the assembled bands being indicated in the drawing by strips 22 of FIG. 1 at each end of the bundle 16.

Alternatively, bundle 16 can comprise a plurality of subgroups of channel fibers, for example, it can comprise 10,000 fibers arranged in 100 subgroups of 100 fibers each. Such a subgroup is illustrated in the end view of FIG. 3. In this arrangement each subgroup 70 is surrounded by an electrically conductive helical winding 72 having ends or leads 74 and 76 at opposite ends of the subgroup, respectively. Each end of the subgroup is then provided with a narrow, thin, metallized band 78 electrically connected to the corresponding nearer end of winding 72 so that when the subgroups are assembled to form the bundle 16 of FIG. 1 the end bands 78 will compose conductive strips 22 of FIG. 1 electrically connecting the windings on all the subgroups in parallel.

Returning to FIG. 1, conductive leads 27 and 28 connect electrically to bands 22, as shown, which as described above connect all individual or group inductive windings in parallel. If switch 24 is closed, by moving its contacting arm to the upper position shown in FIG. 1, the battery 26 will be connected to the paralleled windings and produce a strong magnetic field sufficient to rotate the plane of the polarized light in each fiber so that it will now pass through the analyzer or output plate 18 and impinge upon the photographic plate 20. Obviously, the action is that of a shutter for exposing a photographic plate to an image to be photographed. Opening switch 24 will of course close the "shutter."

Obviously, for high speed photographs switch 24 will preferably be "automated" to close momentarily, that is, for example, for $10^{-9}$ or $10^{-10}$ second. It can be, for example, an instantaneously operative electronic switching device, several forms of which are well known to those skilled in the art. Because of the very low inductance of the parallel connected individual or group windings about the channel fibers of bundle 16, the response of the overall device of FIG. 1 will be very quick.

The channel fibers of bundle 16 may be of glass or plastic, the glasses and plastics suitable for this purpose being extra dense flintglasses, for example, a high lead lanthanum glass, flintglasses generally, crown glasses, fused silica, plastics such as polymethyl methacrylates and numerous other materials well known in the art to possess the required properties.

Figure 3:
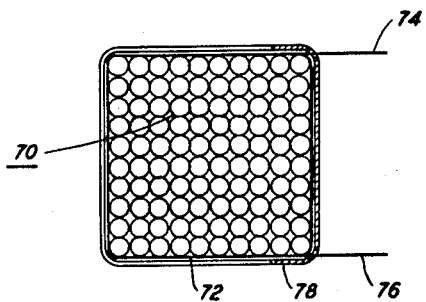
FIG. 3 is illustrative of a subgroup of a plurality of channel fibers enclosed in a single winding as employed in another form of structure of the invention.

Alternatively, the "channel fibers" employed in the arrangements of FIGS. 1, 2 and 3, inclusive, can be transparent, thin-walled (closed) tubes filled with a liquid such as nitrobenzene, carbon bisulfide, colloidal bentonite, or the like.

Instead of providing a metallized collar at each end of each channel fiber as in FIG. 2, or at each end of each group as in FIG. 3, the ends of the assembled bundle 16 of FIG. 1 can be immersed in a bath of melted solder or the like to form the bands 22 making connections to all individual windings in parallel, after which any excess metal is removed from the ends of the fibers. Alternatively, or in addition, a thin, transparent, metallized film can be deposited on the ends of the fibers to facilitate electrical connection to the ends of the helical windings encircling the fibers or groups of fibers.

In general, the usual precautions and procedures employed by those skilled in the art of "Fiber Optics" should be observed in assembling the bundle 16 insofar as the special considerations of the invention permit.

Numerous and varied rearrangements and modifications of the specific illustrative embodiments described in detail hereinabove can readily be made by those skilled in the art without departing from the spirit and scope of the principles of the present invention. It is obvious that no attempt to exhaustively illustrate all such possibilities has been made.

What is claimed is:

1. An optical device comprising a large number of light-conducting channel fiber members, each member having a diameter of less than five-thousandths of an inch, the members being arranged in an ordered array, and a plurality of helical electrical windings, each winding comprising a single layer of a conductor having a diameter of less than five-thousandths of an inch, each winding encircling an integral number of channel fiber members, the integral number being one percent or less of the said large number, the windings being connected electrically in parallel, each channel fiber member being encircled by one of the windings only.

2. An optical device comprising a plurality of light-conducting channel fiber members, each member having a diameter of less than five-thousandths of an inch, an electrically conducting winding comprising a diameter of less than five-thousandths of an inch encircling each member, the channel fiber members being arranged in an ordered array, and all of the windings being connected electrically in parallel.

3. An optical device comprising a large number of light-conducting channel fiber members, each member having a diameter of less than five-thousandths of an inch, the members being arranged in an ordered array and subdivided into a plurality of compact smaller groups, each group including a plurality of channel fiber members, the number of fiber members in each group being one percent or less of said large number, and an electrically conducting winding comprising a single layer of a conductor having a diameter of less than five-thousandths of an inch encircling each group, all of the windings being connected electrically in parallel.

References Cited in the file of this patent

UNITED STATES PATENTS

| | | |
|---|---|---|
| 1,877,744 | Gardner | Sept. 13, 1932 |
| 2,072,419 | Birch-Field | Mar. 2, 1937 |